US012698211B2

(12) United States Patent
Bhattacharya et al.

(10) Patent No.: US 12,698,211 B2
(45) Date of Patent: Aug. 4, 2026

(54) METHOD FOR PRODUCING POROUS NANOCRYSTALLINE SILICON

(71) Applicant: UCHICAGO ARGONNE, LLC, Chicago, IL (US)

(72) Inventors: Sumit Bhattacharya, Darien, IL (US); Daniel Abraham, Bolingbrook, IL (US); Abdellatif M. Yacout, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 821 days.

(21) Appl. No.: 17/812,419

(22) Filed: Jul. 13, 2022

(65) Prior Publication Data

US 2024/0018006 A1      Jan. 18, 2024

(51) Int. Cl.
*C01B 33/039*           (2006.01)
(52) U.S. Cl.
CPC .................................. *C01B 33/039* (2013.01)
(58) Field of Classification Search
CPC ........................... C01B 33/039; C01B 33/023
See application file for complete search history.

(56) References Cited

U.S. PATENT DOCUMENTS 11,066,305 B1 *   7/2021   Ionescu .................. H01M 4/583
2023/0406715 A1 *   12/2023   Katayama ............. C01B 33/021

FOREIGN PATENT DOCUMENTS

CA          2690537 A1 *  12/2008    ............ B01J 20/103

OTHER PUBLICATIONS

Schmidt (Safe Piranhas: A Review of Methods and Protocols, ACS Chem. Health Saf. 2022, 29, 54-61, published Dec. 29, 2021 (Year: 2022).*
Idera et.al. (Evaluation of the Effectiveness of Different Acid Digestion on Sediments, IOSR Journal of Applied Chemistry (IOSR-JAC) e-ISSN: 2278-5736.vol. 7, Issue 12 Ver. I. (Dec. 2014), pp. 39-47), (Year: 2014).*
Homchuen et. al. ("Toward zero waste to landfill: an effective method for recycling zeolite waste from refinery industry", International Conference on Energy Materials and Applications, IOP Conf. Series: Materials Science and Engineering 222 (2017) 012006) (Year: 2017).*

(Continued)

*Primary Examiner* — Michael Forrest
(74) *Attorney, Agent, or Firm* — MARSHALL, GERSTEIN & BORUN LLP

(57)                ABSTRACT

A method of the producing nanocrystalline silicon particulate from a silicate source includes removing contaminants, such as organics and heavy metals, and alumina from the silicate source by treating the silicate source with first and second acidic leaching solutions to form a first intermediate product. The first intermediate product is then reduced by reacting with a magnesium vapor to provide porous magnesiated silicon particulates as a second intermediate product. The second intermediate product is treated with a third leaching solution to remove magnesium and magnesium containing compounds form the second intermediate to thereby provide a third intermediate. The third intermediate is treated with a fourth leaching solution for removing remnant silica to thereby provide nanocrystalline porous silicon particles.

19 Claims, 11 Drawing Sheets

(56) References Cited

OTHER PUBLICATIONS

Kim et.al. ("Zeolite-Templated Mesoporous Silicon Particles for Advanced Lithium-Ion Battery Anodes", ACS Nano 2018, 12, 3853-3864). (Year: 2018).*

Zuo et.al. ("Self-Templating Construction of 3D Hierarchical Macro-/Mesoporous Silicon from 0D Silica Nanoparticles", ACS Nano 2017, 11, 889 -899). (Year: 2017).*

Ergul et.al. ("Electrochemical decomposition of SiO2 pellets to form silicon in molten salts", Journal of Alloys and Compounds 509 (2011) 899-903) (Year: 2011).*

Xie et al (Nanostructure silicon spheres prepared by a controllable magnesiothermic reduction as anode for lithium-ion batteries, Electrochimica Acta 135 (2014) 94-100). (Year: 2014).*

ACS materials web link (https://www.acsmaterial.com).

An et al., Scalable synthesis of ant-nest-like bulk porous silicon for high-performance lithium-ion battery anodes, Nat. Comm., 10:1447:1-11 (2019).

Chen et al., Mesoporous Silicon Anodes Prepared by Magnesiothermic Reduction for Lithium Ion Batteries, J. Electr. Soc., 158(9):A1055-A1059 (2011).

Dai et al., Finned zeolite catalysts, Nature Materials, 19:1074-1080 (2020).

Entwistle et al., A review of magnesiothermic reduction of silica to porous silicon for lithium-ion battery applications and beyond, Journal of Materials Chemistry A, 6(38):18344-18356 (2018).

Entwistle et al., Mechanistic understanding of pore evolution enables high performance mesoporous silicon production for lithium-ion batteries, Journal of Materials Chemistry A, 8(9):4938-4949 (2020).

Hidayat et al., Magnesiothermic Reduction Synthesis of Silicon Carbide with Varying Temperatures: Structural and Mechanical Features, IOP Conference Series: Materials Science and Engineering, 515:1-6 (2019).

Homchuen et al., Toward zero waste to landfill: an effective method for recycling zeolite waste from refinery industry, IOP Conf. Series: Materials Science and Engineering, 2nd International Conference on Energy Materials and Applications, 222:1-6 (2017).

Liu et al., Scalable synthesis of Si nanostructures by low-temperature magnesiothermic reduction of silica for application in lithium ion batteries, Nano Energy, 4:31-38 (2014).

McKeown., Polymers of Intrinsic Microporosity, International Scholarly Research Notices, ISRN Materials Science, 2012:1-16, (2012).

Richman et al., Ordered Mesoporous Silicon through Magnesium Reduction of Polymer Templated Silica Thin Films, Nano Lett., 8(9):3075-3079 (2008).

Salonen et al., Mesoporous silicon in drug delivery applications, Journal of Pharmaceutical Science, 97(2):632-653 (2008).

Scalable synthesis of Si nanostructures by low temperature magnesiothermic reduction of silica for application in lithium-ion batteries, Nano Energy, vol. 4, 2014.

Tasciotti et al., Mesoporous silicon particles as a multistage delivery system for imaging and therapeutic applications, Nature Nanotechnology, 3:151-157 (2008).

Virta., Natural Zeolites, Zeolites, 84.1-84.3 (2002).

Zeolite-Templated Mesoporous Silicon Particles for Advanced Lithium-Ion Battery Anodes, J. Mater. Chem. A, 2018, 6, 18344-18356 should be: ACS Nano 2018, 12, 4, 3853-3864.

* cited by examiner

| Element | At. No. | Netto | Wt % | Wt. Norm. [%] | Atom [%] | abs. error [%] (1 sigma) | rel. error [%] (1 sigma) |
|---|---|---|---|---|---|---|---|
| Oxygen | 8 | 8918 | 8.447296 | 35.10699126 | 57.96584 | 1.227536 | 14.5317 |
| Sodium | 11 | 4662 | 7.132193 | 14.61753186 | 12.06015 | 0.477553 | 6.695734 |
| Aluminium | 13 | 5082 | 1.23875 | 25.054625976 | 22.040514 | 0.085894 | 6.93392 |
| Silicon | 14 | 3471 | 0.681525 | 24.881256343 | 24.664144 | 0.056925 | 8.352634 |
| Magnesium | 12 | 37 | 0.059631 | 0.339594563 | 0.16936 | 0.03663 | 61.42753 |
| | | Sum | 17.55939 | 100 | 100 | | |

| Element | At. No. | Netto | Wt. [%] | Wt. Norm. [%] | Atom [%] | abs. error [%] (1 sigma) | rel. error [%] (1 sigma) |
|---|---|---|---|---|---|---|---|
| Oxygen | 8 | 28502 | 46.1723 | 46.1723023 | 60.06359 | 1.203618 | 2.606796 |
| Aluminium | 13 | 1250 | 1.551505 | 1.55150504 | 1.196795 | 0.063799 | 4.112094 |
| Silicon | 14 | 27404 | 52.27619 | 52.2761927 | 38.73961 | 1.331941 | 2.547893 |
| Sum | | | 100 | 100 | 100 | | |

| Element | At. No. | Netto | Wt. [%] | Wt. Norm. [%] | Atom [%] | abs. error [%] (1 sigma) | rel. error [%] (1 sigma) |
|---|---|---|---|---|---|---|---|
| Oxygen | 8 | 359 | 0.32874 | 0.32874 | 0.577423 | 0.035616 | 10.83405 |
| Sodium | 11 | 0 | 0 | 0 | 0 | 0 | 2.540918 |
| Magnesium | 12 | 0 | 0 | 0 | 0 | 0 | 2.514465 |
| Aluminium | 13 | 1054 | 0.452367 | 0.452367 | 0.471162 | 0.036332 | 8.031481 |
| Silicon | 14 | 190603 | 97.64327 | 97.64327 | 97.70246 | 2.467781 | 2.527344 |
| Sulfur | 16 | 0 | 0 | 0 | 0 | 0 | 2.5584 |
| Chlorine | 17 | 1813 | 1.575621 | 1.575621 | 1.248958 | 0.064847 | 4.115645 |
| | | Sum | 100 | 100 | 100 | | |

Recovered Si particles
Exposed to 0.05M HF (8 part)
DI water (2 part)
Ice cold water bath (0 hours)

After 24 hours
(Si nano particles settled down)

2-4 nm porosity channel

Spectrum 1

| Element | At. No. | Netto | Mass [%] | Mass Norm. [%] | Atom [%] | abs. error [%] (1 sigma) | rel.error [%] (1 sigma) |
|---|---|---|---|---|---|---|---|
| Silicon | 14 | 138806 | 200.26 | 93.79 | 93.32 | 8.37 | 4.18 |
| Aluminum | 13 | 6740 | 8.69 | 4.07 | 4.21 | 0.46 | 5.28 |
| Magnesium | 12 | 3848 | 4.58 | 2.14 | 2.47 | 0.30 | 6.54 |
| | | sum | 213.53 | 100.00 | 100.00 | | |

METHOD FOR PRODUCING POROUS NANOCRYSTALLINE SILICON

STATEMENT OF GOVERNMENT SUPPORT

This invention was made with government support under Contract No. DE-ACO2-06CH11357 awarded by the United States Department of Energy to UChicago Argonne, LLC, operator of Argonne National Laboratory. The government has certain rights in the invention

FIELD

The disclosure relates to a method for producing pure silicon particulate and more particularly to a method for producing nanocrystalline porous silicon from silicate sources such as zeolites.

BACKGROUND

Mesoporous silicon can be used in a wide range of applications, such as pharmaceutical and energy storage. In the pharmaceutical industry, mesoporous silicon can be used in multistage drug delivery systems for imaging and therapeutic applications as well as in biosensors. In the energy storage industry, mesoporous silicon is used as an anode material to increase lithium ion cell capacity. This silicon is versatile as it can be tailored to have a large surface area, luminescence, modifiable surface chemistry, and biocompatibility.

The biggest challenged impeding production of mesoporous silicon is attaining purity levels that are suitable for a target application. Conventional methods such as direct reduction of template porous silica with magnesium and electrochemical etching of pure silicon to generate porous networks are too expensive for large scale production. The production cost of template porous silica (MCM-41, SBA-15) is significant ($25-$35 per g), which makes such production economically unsustainable. With electrochemical etching, 90-95 wt % of all Si is wasted, as it is dissolved in the acid etchants, which is also an economically unsustainable method.

Use of alumina silicate based Y, Beta and ZSM-5, zeolites have been reported for direct forming of mesoporous silicon using magnesiothermal reduction. However, the magnesium alone is insufficient to remove aluminum from the zeolite precursor so the developed porous Si retains large amounts of aluminum in oxide form and is therefore electronically insulating. There has been no method to date capable of generating porous silicon directly from sand (silica), as there is no reduction method capable of generating the porous structure.

SUMMARY

Provided herein is a method for the production of macro/ meso porous silicon by magnesiothermic reduction of a silicate source, such as zeolites. Zeolites are readily available from waste and natural sources and have a porous structure that is needed in the end product. Contrary to conventional magnesiothermal reduction methods, the method of the disclosure beneficially provides a means to remove embedded alumina.

DETAILED DESCRIPTION

Figure 1:
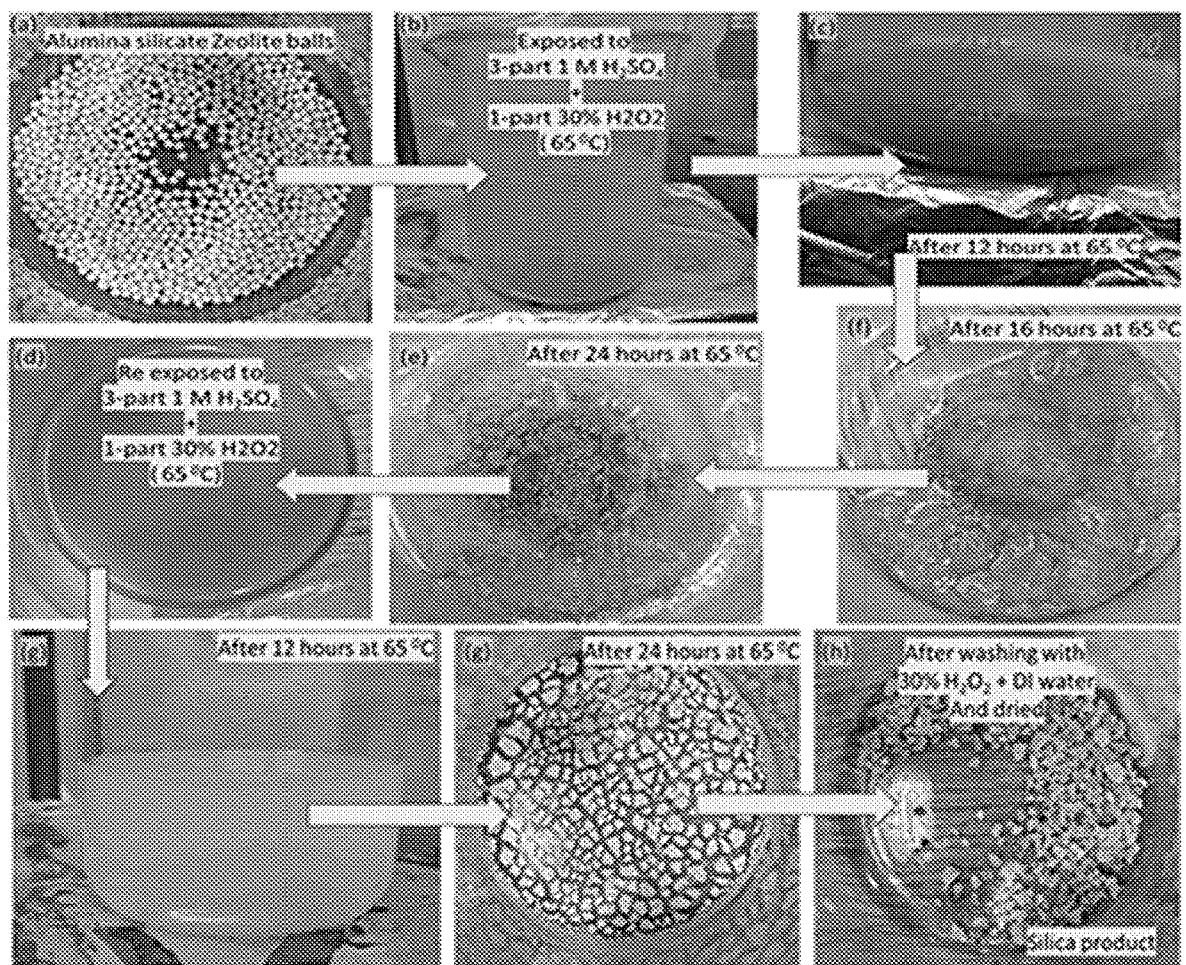
FIG. 1 is a photograph showing a first treatment step of a method in accordance with the disclosure.

Methods of the disclosure provide for forming porous silicon particles from a silicate source. Zeolites can be advantageously used as the silicate source. Zeolites are abundant both naturally and through recovery from waste. The method generally includes removing contaminants, such as organics and heavy metals, and alumina from the silicate source by treating the silicate source with first and second acidic leaching solutions to form a first intermediate product. The first intermediate product is then reduced by reacting with a magnesium vapor to provide porous magnesiated silicon particulates as a second intermediate product. The second intermediate product is treated with a third leaching solution to remove magnesium and magnesium containing compounds form the second intermediate to thereby provide a third intermediate. The third intermediate is treated with a fourth leaching solution for removing remnant silica to thereby provide nanocrystalline porous silicon particles. The method can include crushing the silicate source to smaller particulate sizes before exposure to the first and second acidic leaching solutions. The method can include crushing the first intermediate product to a finer particle size before reduction with magnesium vapor.

The silicate source can be zeolites. Natural or waste zeolites can be used, for example. Waste zeolites can be from an industrial production method. Zeolites can be resourced, for example, from the waste streams of petrochemical industries, the water filtration industry, and catalyst industries. Zeolites are also naturally occurring or synthetically produced in abundance, and such zeolites could also be used in the method herein.

The first leaching treatment of the silicate source can include treating with the first acidic leaching solution and then treating the resulting precipitate with the second acidic leaching solution. Alternatively, the method can include treating with the second acidic leaching solutions and then treating with the first acidic leaching solution. Treatment with the first and second acidic leaching solutions, in any desired order, can be repeated any number of times depending on the level of contamination of the silicate source. The reacted contaminants are removed from the silicate source by decanting the first and second leaching solutions, the contaminants are either soluble in the aqueous solvent of the leaching solutions or leave the solution in the form of gas (e.g., $CO_2$). A precipitate is retrieved from the leaching method.

This precipitate can be retreated with fresh first and second acidic leaching solutions to further reduce the amount of contaminants. Each treatment can include exposing the silicate source (or precipitate recovered from leaching treatment) to the first or second acidic leaching solutions for a treatment time sufficient for contaminants in the silicate source to dissolve in the respective one of the first or second leaching solution. For example, the treatment time can be about 24 hours. The exposure can be done while stirring. For example, the silicate source or precipitate can be stirred by magnetic stirring for the entire treatment time. After the treatment time, the resulting precipitate can be allowed to settle. Any settling method can be used, such as gravity settling. The precipitate can be allowed to settle, for example, for about 12 hours. After the precipitate has settled, the first and second leaching solutions can be decanted and the precipitate can be dried. For example, the precipitate can be dried in ambient conditions or with applied heat. After drying, the precipitate can be retreated with the first or second leaching solutions. Once the first leaching treatment is complete, the final precipitate is recovered as the first intermediate product.

Referring to FIG. 1, an example treatment with a first leaching solution is shown. The silicate source is exposed to a solution containing 3 parts 1 M $H_2SO_4$ and 1 part 30% $H_2O_2$ at a treatment temperature of 65° C. FIG. 1 shows the treatment at 12 hours, 16 hours, and 24 hours. After 24 hours, the slurry was dried and then remixed with fresh first leaching solution. After an additional 24 hours of treatment in this fresh leaching solution, the slurry was allowed to settle and the solution was decanted. Remnant solution can be removed using a syringe, for example. The slurry can then be dried over a hot plate to form a dried precipitate and then washed with a solution of 5 parts $H_2O_2$ (30% strength) and 2 parts DI water. The particles were allowed to settle for another 12 hours, after which the solution was decanted and then dried over a hot plate.

Figure 3:
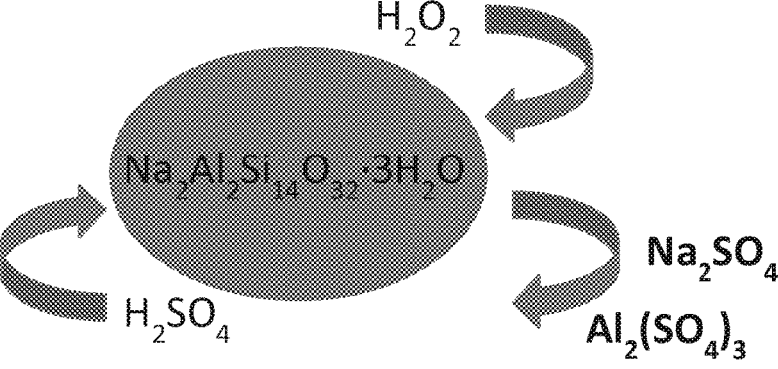
FIG. 3 is a schematic illustration of reaction product formed with treatment of the first acidic leaching solution.

The first leaching solution contains sulfuric acid and hydrogen peroxide. This first leaching solution reacts with organic contaminants and alumina in the silicate source. For example, the first leaching solution can include 3 parts of sulfuric acid ($H_2SO_4$) and 1 part hydrogen peroxide ($H_2O_2$). Referring to FIG. 3, the hydrogen peroxide present in the first leaching solution aids in removal of organic residues that are typically found in used zeolites, for example when waste zeolites are used as the silicate source. Additionally, the hydrogen peroxide hydrolyzes the $Al_2O_3$ to $Al(OH)_3$, which then reacts with the sulfuric acid also present in the first leaching solution. This reaction results in formation of $Al_2(SO_4)_3$, which becomes water soluble and can be removed when decanting the aqueous first leaching solution.

The first leaching solution can be maintained at a temperature of about 55° C. to about 65° C. It has been found that at temperatures below 55° C., the reactions carried out by the first leaching solution are inefficient, while at temperatures above 65° C. hydrogen peroxide is unstable and decomposes.

The second leaching solution includes perchloric acid ($HClO_4$) and reacts with any heavy metals present in the silicate source. Such heavy metals can include, for example, Pb, Cd, As, Cr, Tl, and Hg. For example, the second leaching solution can include 2 parts perchloric acid ($HClO_4$) and 1 part $H_2O$. The second leaching solution can be maintained at room temperature.

Figure 2A:
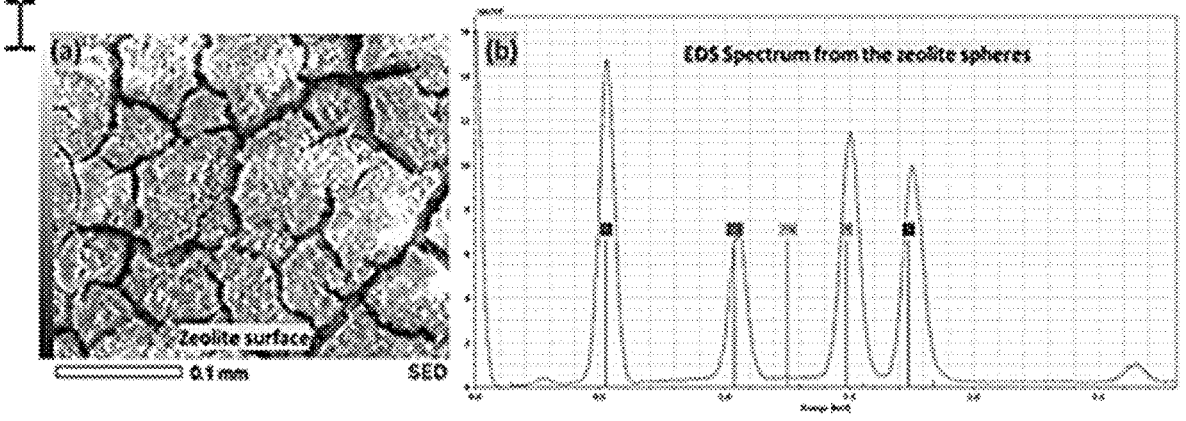
FIG. 2A is a scanning electron microscopy (SEM) image and associated EDS spectrum of zeolites used as a silicate source. The EDS spectrum shows peaks of Na, Al, Si, and O.
Figure 2B:
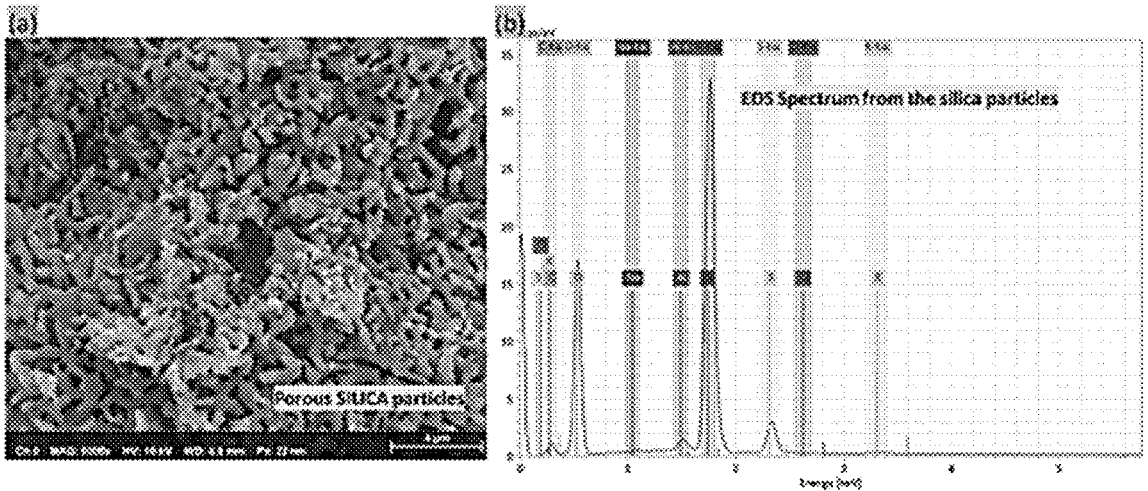
FIG. 2B is a scanning electron microscope (SEM) image and associated EDS spectrum for a first intermediate product from a method in accordance with the disclosure. The EDS spectrum shows peaks of Si and O; the Al and Na amounts were reduced. The sulfur content was from the sulfuric acid exposure during the leaching treatment.

The first intermediate product includes a porous form of silica. As compared to the starting silicate source, the first intermediate product has a reduced amount of aluminum, sodium, organic residues and/or heavy metal compounds. FIGS. 2A and 2B show elemental analysis of a zeolite silicate source as received and after treatment with the first and second leaching solutions, respectively.

Figure 4:
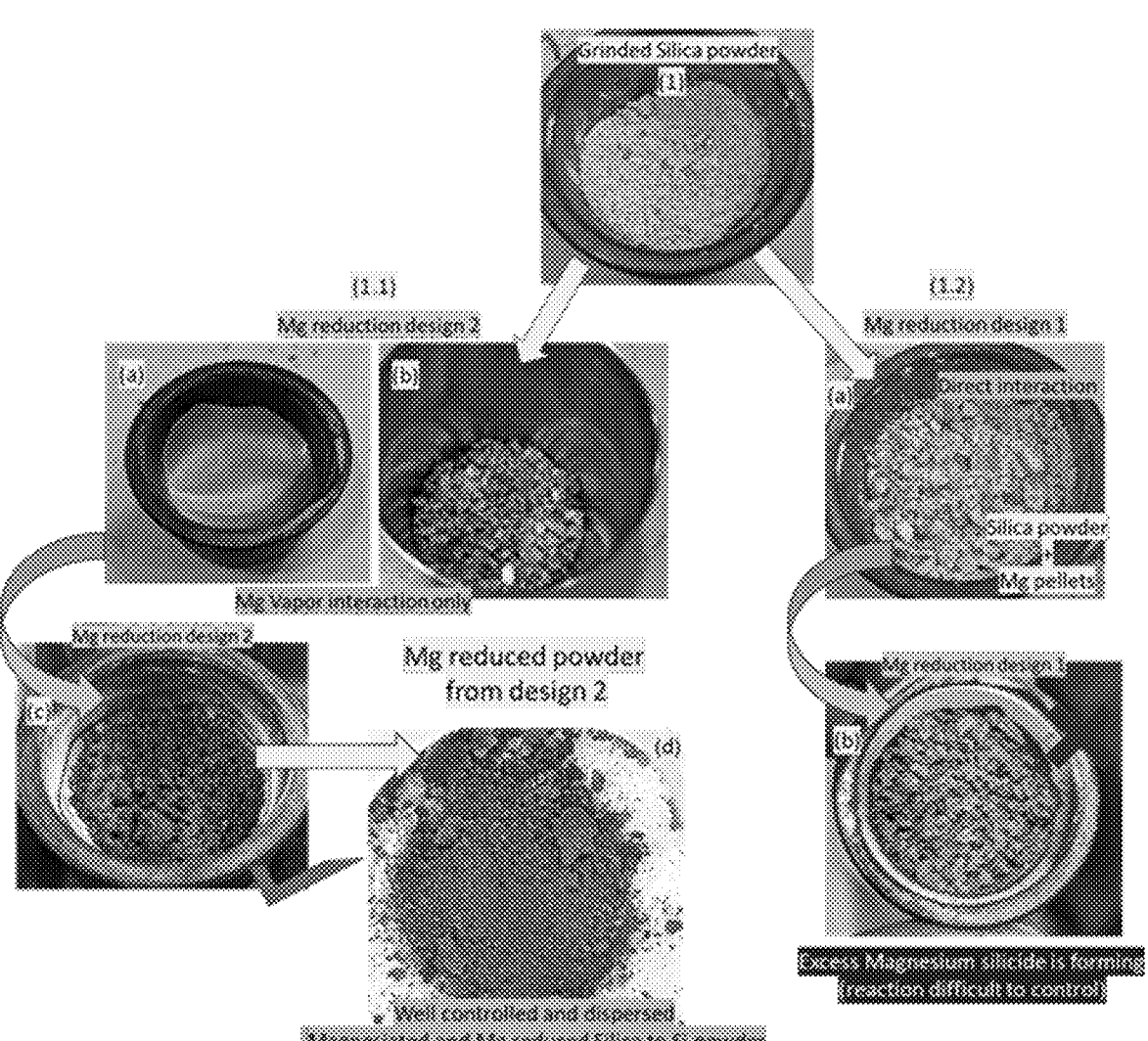
FIG. 4 is a photograph showing magnesium reduction of the first intermediate in accordance with the method of the disclosure.

Referring to FIG. 4, the first intermediate product is then reduced by reacting the first intermediate product with magnesium vapor under conditions sufficient to reduce silica to a second intermediate product. The reduction reaction (equation 1) is highly exothermic and generates a significant heat ($\Delta H = 586.7$ kJ/mol silica), which could lead to the collapse of the porous structure or undesirable reaction products such as shown in equations (2) and (3). To avoid such collapse or undesirable reaction products, it has been found that a reduction temperature of 700 to 750° C. should be maintained.

$$2Mg + SiO_2 = 2MgO + Si \qquad (1)$$

$$2Mg + Si = Mg_2Si \qquad (2)$$

$$2MgO + SiO_2 = Mg_2SiO_4 \qquad (3)$$

The magnesium vapor treatment can be completed by placing the first intermediate product on a porous divider above a magnesium and/or magnesium containing compound and heating the first intermediate product and the magnesium and/or magnesium containing compounds to a temperature of about 700° C. to about 750° C. in an Ar atmosphere to produce a magnesium vapor that is capable of interacting through the porous channels of the first intermediate product to reduce it to the second intermediate product. The magnesium vapor is maintained at a vapor pressure of about 3 Torr. It was advantageously found that this design set-up only allowed Mg vapors to interact with the silica particulates and provided just enough Mg to achieve a near complete redox reaction without unnecessary pore clogging. This is because of prevention of over-deposition of Mg in the tortuous open channels that can prevent further vapor diffusion. Alternatively, the magnesium vapor exposure can be done in a cell under vacuum at a temperature of about 700° C. to about 750° C. In this arrangement, a vapor pressure of about 17 Torr is maintained at 750° C., and about 10 Torr at 700° C. In either arrangement, the magnesium source can be in the pellet form. Magnesium pellets can be advantageous over Mg powder, as the pellets are neither pyrophoric nor air sensitive, making them easier to handle in ambient conditions. Magnesium powder is air sensitive and even pyrophoric depending on powder size distribution.

The method can include grinding the first intermediate product to a fine particle size before reducing the first immediate product with the magnesium vapor.

The second intermediate product is a porous magnesiated silicon particulate. The porous magnesiated silicon particulates comprise pure silicon enveloped in a layer of MgO and unreacted pure Mg. This second intermediate product can be useful, for example, as battery electrode material. If such use is desired, the second intermediate product can be recovered. Referring to FIGS. 5A-5D, SEM-EDS elemental mapping of Mg-reduced silica particulates (second intermediate product) was done identifying (A) Al; (B) Mg; (C) Si; and (D) O. FIGS. 6A-6D show a close-up image of the Mg-reduced silica particulate showing its porous nature (in A) and identifying the elements (B) Mg, (C) Si, and (D) O.

Figure 7:
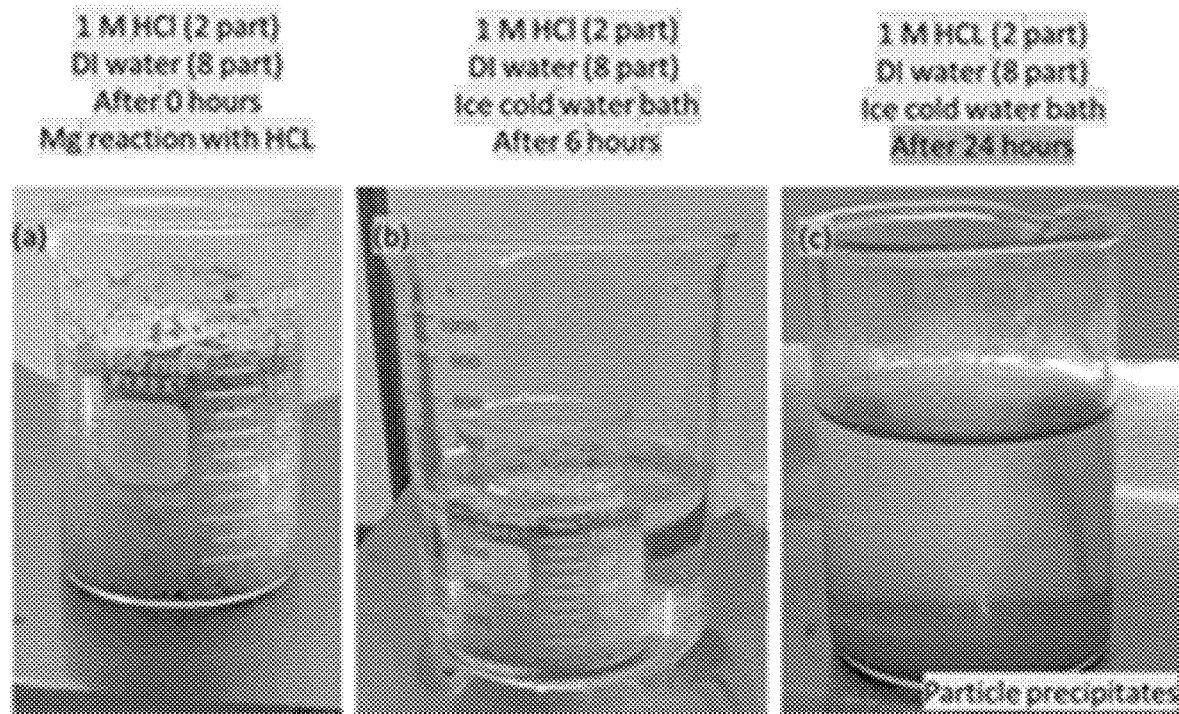
FIG. 7 is a photograph of treatment with the third leaching solution in accordance with the method of the disclosure.

Referring to FIG. 7, the third leaching solution can include one or more of hydrochloric acid (HCl), nitric acid ($HNO_3$), and perchloric acid ($HClO_4$). For example, the third leaching solution can include 20 vol % hydrochloric acid (HCl) and 80 vol % deionized water. The third leaching solution should be maintained at a temperature of about 10° C. to about 30° C. For example, the treatment with the third leaching solution can be completed in an ice-cold bath to prevent conversion of the developing silicon to silica. Unreacted Mg, MgO, and $Mg_2Si$ dissolves and reacts with the aqueous HCl to form $MgCl_2$. Treatment with the third leaching solution can include exposing the second intermediate to the third leaching solution for a treatment time sufficient to allow for removal of magnesium and magnesium containing compounds from the second intermediate product. For example, the treatment time can be about 24 hours. After treatment, the third leaching solution is removed or decanted, which results in removal of magnesium and magnesium containing contaminants. This results in a third intermediate product. The third intermediate product can be rinsed with water, for example pure DI water, to further remove CI ion contaminants.

For example, treating the second intermediate product with the third leaching solution can include mixing the second intermediate in the third leaching solution until a reaction between Mg present in the second intermediate product and CI ions or nitrate ions present in the third leaching solution is complete. The mixture can then be allowed to settle and the leaching solution decanted only after the particulate, which is the third intermediate product, is settled. For example, the solution can be mixed for about 24 hours and then allowed to settle before decanting, leaving a brown particulate layer. For example, one the reaction with the third leaching solution is complete, the mixture can be removed from the ice bath and kept under ambient conditions for 24 hours for settling.

Figure 8:
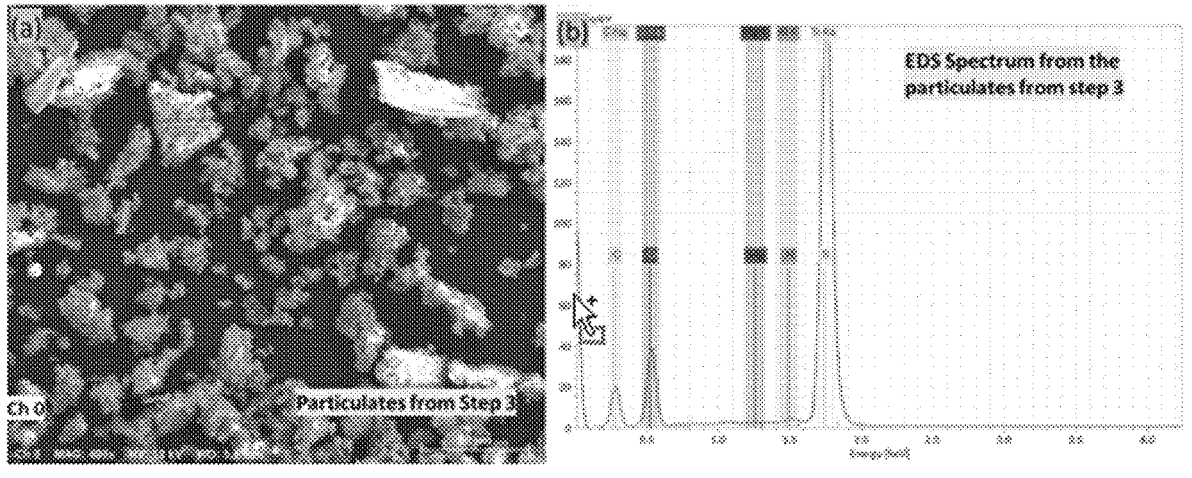
FIG. 8 is SEM surface imaging and EDS spectrum of the third intermediate product showing a strong Si peak and smaller O and C peaks, with Mg and Al peaks being very weak.

Referring to FIG. 8, SEM surface image of the third intermediate product and EDS spectrum analysis showed a strong Si peak and smaller O and C peaks. Mg and Al peaks were very weak and present in very low amounts particularly as compared to the original silicate source (shown in FIG. 2A).

Figure 9:
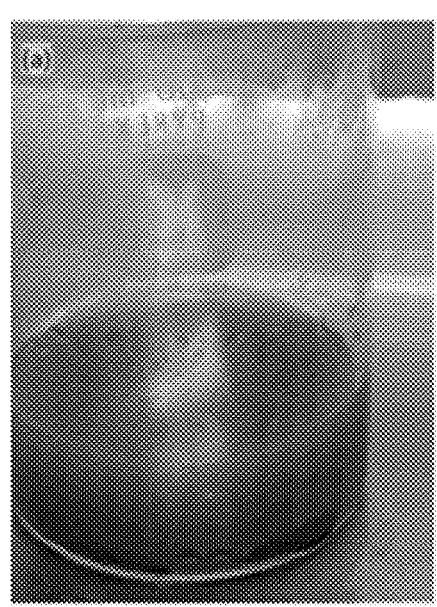
FIG. 9 is photograph of treatment with the fourth leaching solution in accordance with the method of the disclosure.
Figure 9:
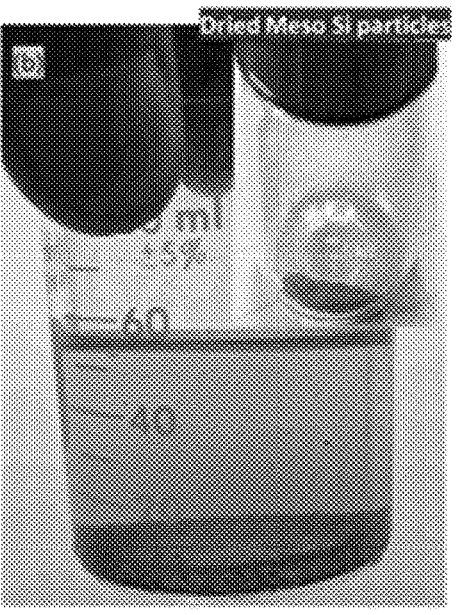

Referring to FIG. 9, the fourth leaching solution can include containing HF. For example, the fourth leaching solution can include 80 vol % HF and 20 vol % deionized water. The fourth leaching solution can be maintained at a temperature of about 10° C. to about 30° C. For example, the treatment can be performed in an ice-cold bath to hinder silicon oxidation. The third intermediate product can be exposed to the fourth leaching solution for a treatment time sufficient to remove remnant silica from the third intermediate. For example, the treatment time can be about 24 hours.

The methods of the disclosure provide a nanocrystalline porous silicon product that is at least 90 wt % pure silicon. For example, the method of the disclosure can generate 90 to 94 wt % Si product. This is significantly improved as compared to conventional methods, which only produce yields in the range of 60 to 65 wt % silicon. As shown in FIG. 9, the resulting silicon product is brown in color. By contrast, silica is white.

Figure 10:
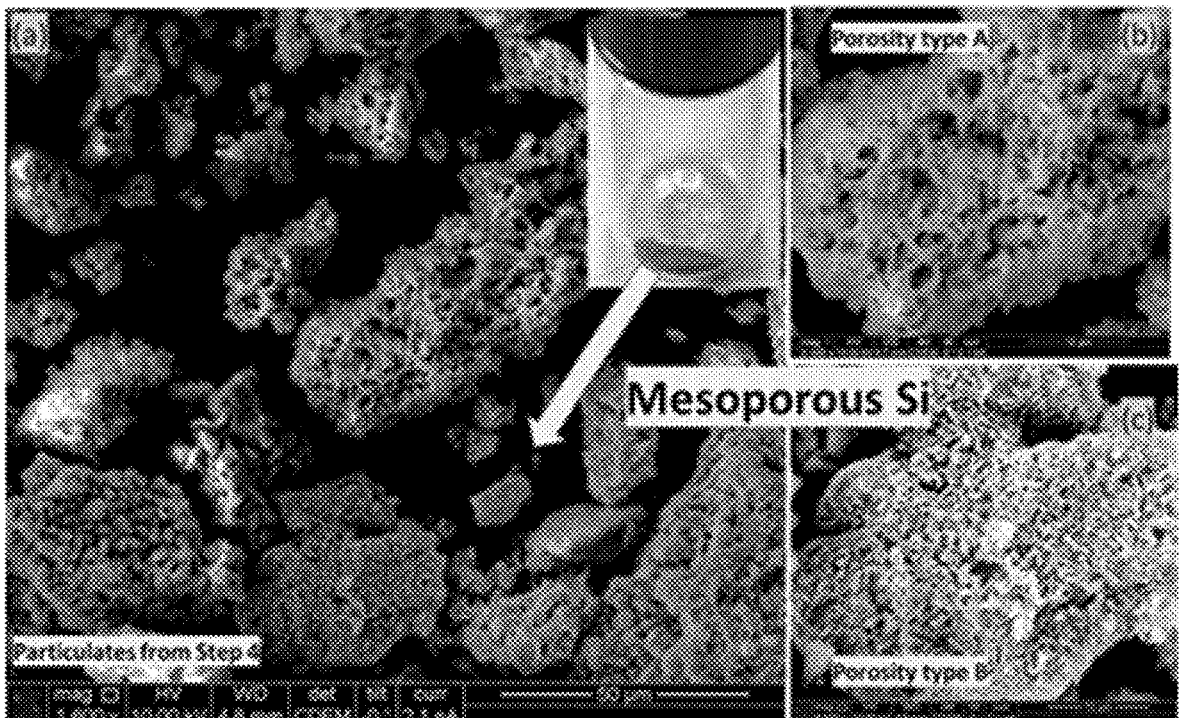
FIG. 10 is SEM images of the porous silicon product recovered after treatment with the fourth leaching solution.
Figure 11A:
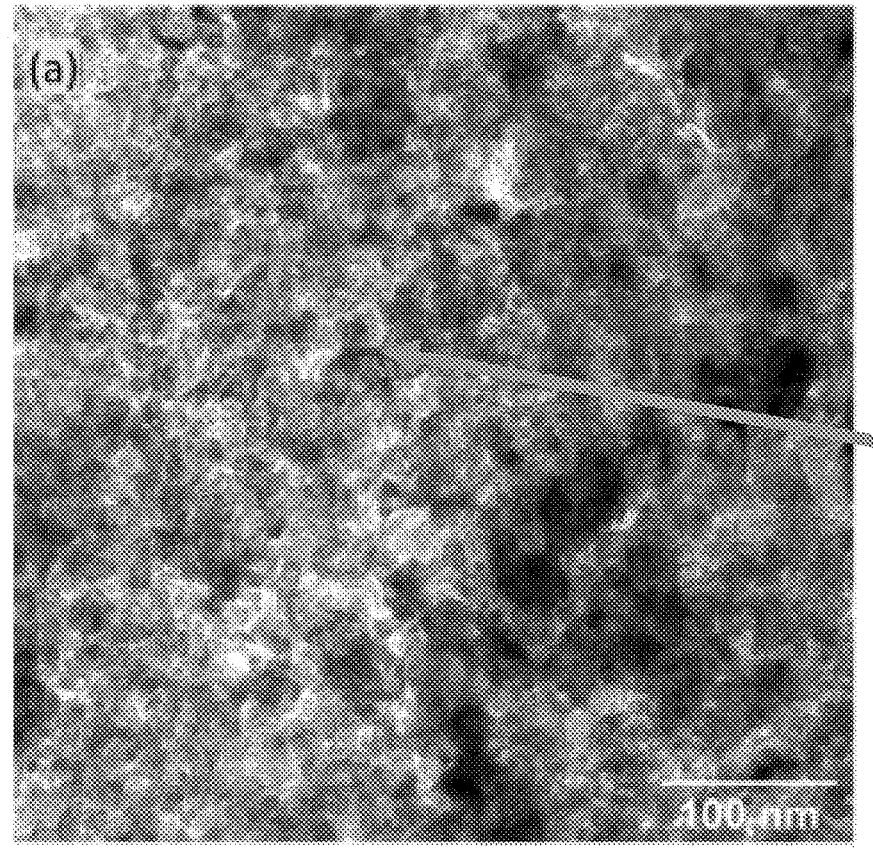
FIG. 11A is a TEM bright field image of a representative silicon particulate produced in accordance with the disclosure showing a grain size distribution of about 20 nm to about 30 nm.
Figure 11B:
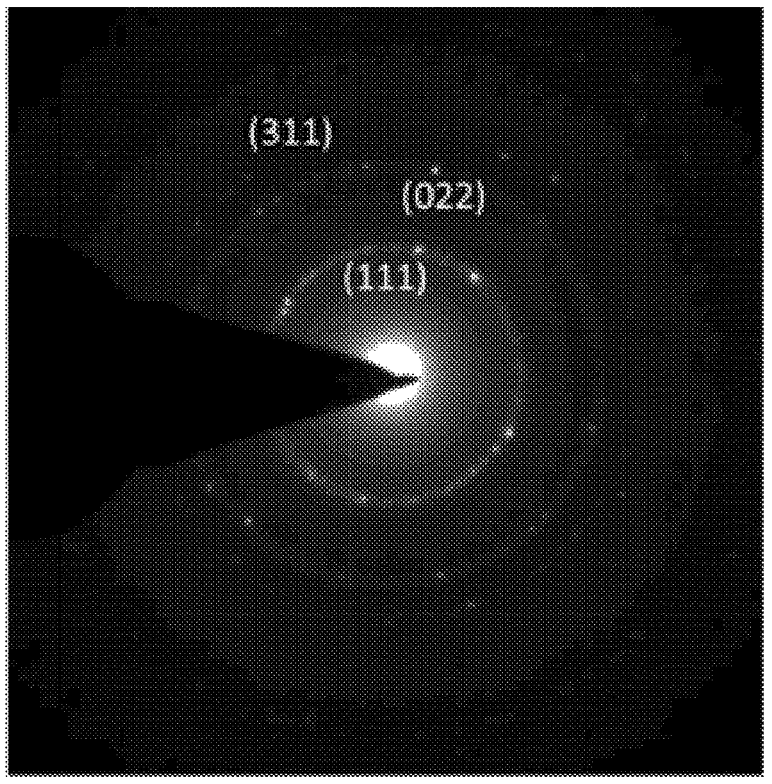
FIG. 11B is a selected area electron diffraction (SAED) image confirming that the Si product was nanocrystalline with a diamond-cubic structure, which is typical of pure Si.

Referring to FIG. 10, the porosity of the resulting silicon was confirmed by SEM surface analysis. The particle size of the analyzed silicon particulate was about 60 μm to about 100 μm. Two types of porosity was identified within the particulates—mesoporous Si (0.2 to 2 μm size pores) and macroporous Si (1 to 5 μm size pores). Referring to FIG. 11A, TEM bright field imaging of one representative particulate showed a grain size distribution of about 20 nm to about 30 nm. Referring to FIG. 11B, selected area electron diffusion (SAED) confirmed that the Si product had a nanocrystalline diamond-cubic structure, which is typical for pure Si.

The resulting silicon product was found to be stable, and capable of being stored in a relative inert atmosphere. The silicon product was capable of being handled without oxidation. Without intending to be bound by theory, it is believed that the minute amount of Mg and Al present in the matrix as a result of the method of the disclosure may help to develop an ultra-thin protective oxide barrier layer that improves the silicon product stability.

EXAMPLES

Zeolite spheres were crushed with a mortar and pestle into particles and then treated with a first leaching solution containing 3 parts 1 M $H_2SO_4$ and 1 part $H_2O_2$ while maintaining a temperature of 65° C. The resulting slurry was stirred with a magnetic stirrer during the treatment. After about 24 hours at 65° C., the slurry was dried and then remixed with fresh first leaching solution and stirred for another 12 hours. The slurry was then allowed to settle and the solution was decanted. Remnant solution was carefully removed with a syringe. Following this, the wet paste slurry was dried over a hot plate to form a dry precipitate. The dry precipitate was then mixed with a second leaching solution containing 5 parts $H_2O_2$ (30% strength) and 2 parts deionized water. The particles were allowed to settle over 12 hours, after which the solution was decanted. The resulting slurry paste was dried over a hot plate, thereby resulting in the first intermediate product. The first and second leaching solutions remove heavy metals and organic contaminants, as well as alumina from the zeolites. The $H_2O_2$ removed CI ions by reacting to form HCl and $O_2$, as well as remove carbon-based compounds by forming $CO_2$. The first leaching solution containing the sulfuric acid removes Al and ammonia through formation of ammonium sulfate.

The first intermediate product was then further ground to form more uniform sized particulate (FIG. 4). The particulates were pre-activated by heat treating them inside a vacuum chamber maintained at 120° C. for 30 minutes. Magnesiothermal reduction of silica to silicon was performed by keeping the Mg pellets separate from the silica particulate. In particular, the first intermediate product was kept over a 5-15 micron steel mesh over a crucible containing the Mg pellets. The system was heated to 700-750° C. for 30-45 minutes under UHP Ar atmosphere. Mg vapors interacted with the first intermediate product to reduce the silica to silicon and produce a second intermediate product containing silicon and MgO. Under the furnace conditions, an about 0.05 psi of Mg vapor pressure was maintained to complete the redox reaction. This approach was beneficially found to prevent unnecessary clogging and over-deposition of Mg that can prevent further vapor diffusion. The second intermediate product was a fine powder and very few silica particulates agglomerates were observed.

The second intermediate product was then treated with a third leaching solution of (2 parts 1 M HCl and 8 parts deionized water) to remove the Mg. The treatment was performed in an ice-cold water bath for 6 hours. The lower temperature was needed to prevent oxidation of the silicon particulates. Unreacted Mg, MgO, and $Mg_2Si$ dissolved and reacted with the HCl in the third leaching solution to form $MgCl_2$. When all the observable Mg reaction with HCl was complete, the solution was removed from the ice water bath and kept under ambient conditions for 24 hours. This allowed the powder to settle. The solution was then decanted from the settled power, leaving the silicon product, which presented as a layer of brown particulate. The brown particulates were air-dried without applied heat to form the third intermediate product.

Remnant silica present in the brown particulate was removed by mixing the particulate with a fourth leaching solution containing 8 parts 0.05 M HF and 2 parts deionized water. The treatment was performed in an ice-cold bath. The HF removes $SiO_x$ from the particulates. The solution was decanted after 24 hours and the settled particles were collected and air dried at ambient conditions. The resulting product was porous Si, which was found to be mostly nanocrystalline (20-30 nm) with a diamond cubic structure. The resulting product was 94 wt % silicon, with 4 wt % Al and 2 wt % Mg left within the matrix. The small remaining amounts of Mg and Al could be beneficial in the final product to prevent excessive oxidation of the nanocrystalline Si particulates.

Characterization

The first intermediate product was characterized by SEM-EDS (FIG. 2B) and compared to the starting zeolite (FIG. 2A). The starting zeolite contained large percentages of Na, Al, Si, and O as shown in Table 1 below. The first intermediate product contained mainly silicon and oxygen as shown in Table 2. The concentration of Al and Na was significantly lower in the first intermediate product and the first intermediate product is mainly silica. The first intermediate was 93% pure silica. The sulfur content was as result of the sulfuric acid exposure during from the first leaching solution.

TABLE 1

Starting Zeolite EDS Characterization

| Element | At. No. | Netto | Wt % | Wt Norm. % | Atom % | Abs. Error % (1 sigma) | Rel. Error % (1 sigma) |
|---|---|---|---|---|---|---|---|
| Oxygen | 8 | 8918 | 8.447296 | 35.10699126 | 57.96584 | 1.227536 | 14.5317 |
| Sodium | 11 | 4662 | 7.132193 | 14.61753186 | 12.06015 | 0.477553 | 6.695734 |
| Aluminum | 13 | 5082 | 1.23875 | 25.054625976 | 22.040514 | 0.085894 | 6.93392 |
| Silicon | 14 | 3471 | 0.681525 | 24.881256343 | 24.664144 | 0.056925 | 8.352634 |
| Magnesium | 12 | 37 | 0.059631 | 0.339594563 | 0.16936 | 0.03663 | 61.42753 |
| Total | | | 17.55939 | 100 | 100 | | |

TABLE 2

First Intermediate Product EDS Characterization

| Element | At. No. | Netto | Wt % | Wt Norm. % | Atom % | Abs. Error % (1 sigma) | Rel. Error % (1 sigma) |
|---|---|---|---|---|---|---|---|
| Oxygen | 8 | 28502 | 46.1723023 | 46.1723023 | 60.06359 | 1.203618 | 2.606796 |
| Aluminum | 13 | 1250 | 1.551505 | 1.55150504 | 1.196795 | 0.063799 | 4.112094 |
| Silicon | 14 | 27404 | 52.27619 | 52.2761927 | 38.73961 | 1.331941 | 2.547893 |
| Total | | | 100 | 100 | 100 | | |

Figure 5:
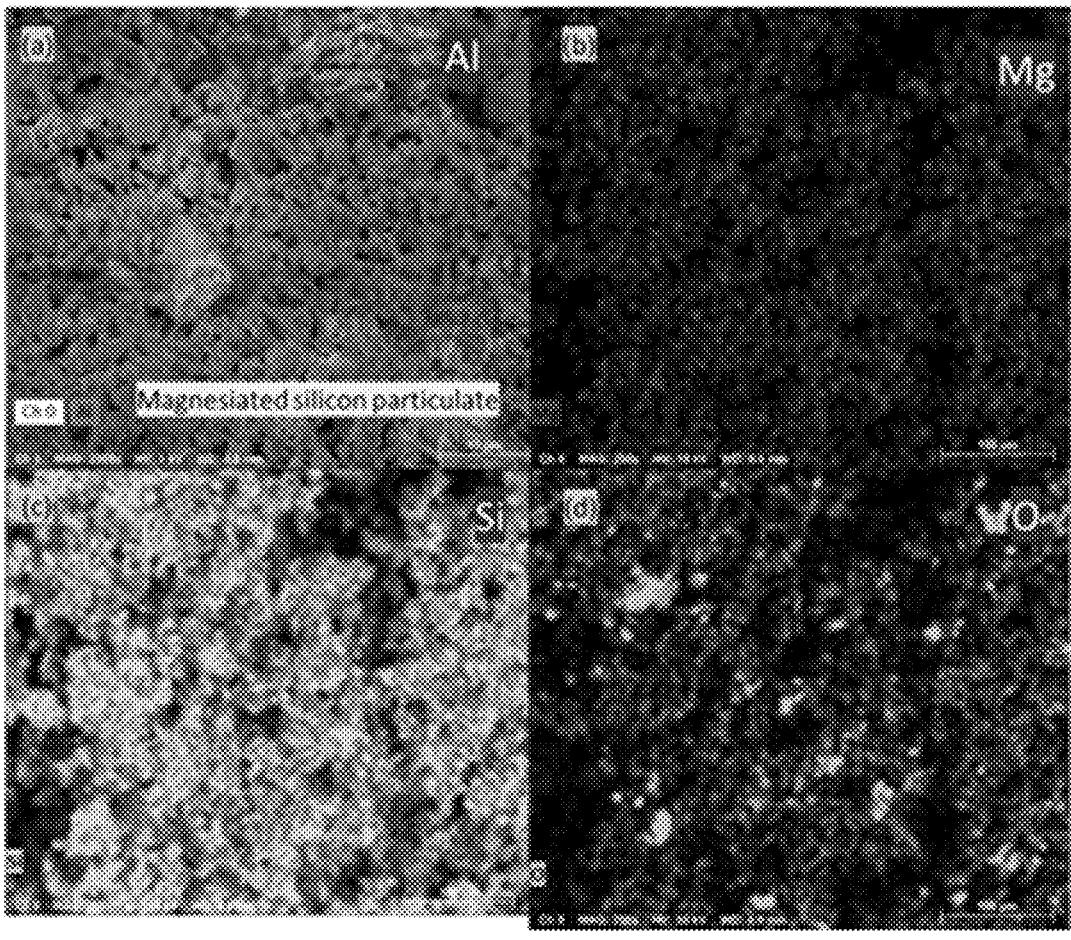
FIGS. 5A-5D is an SEM-EDS elemental mapping of Mg-reduced silica particulates identifying (A) Al, (B) Mg, (C) Si, and (D) O contents.
Figure 6:
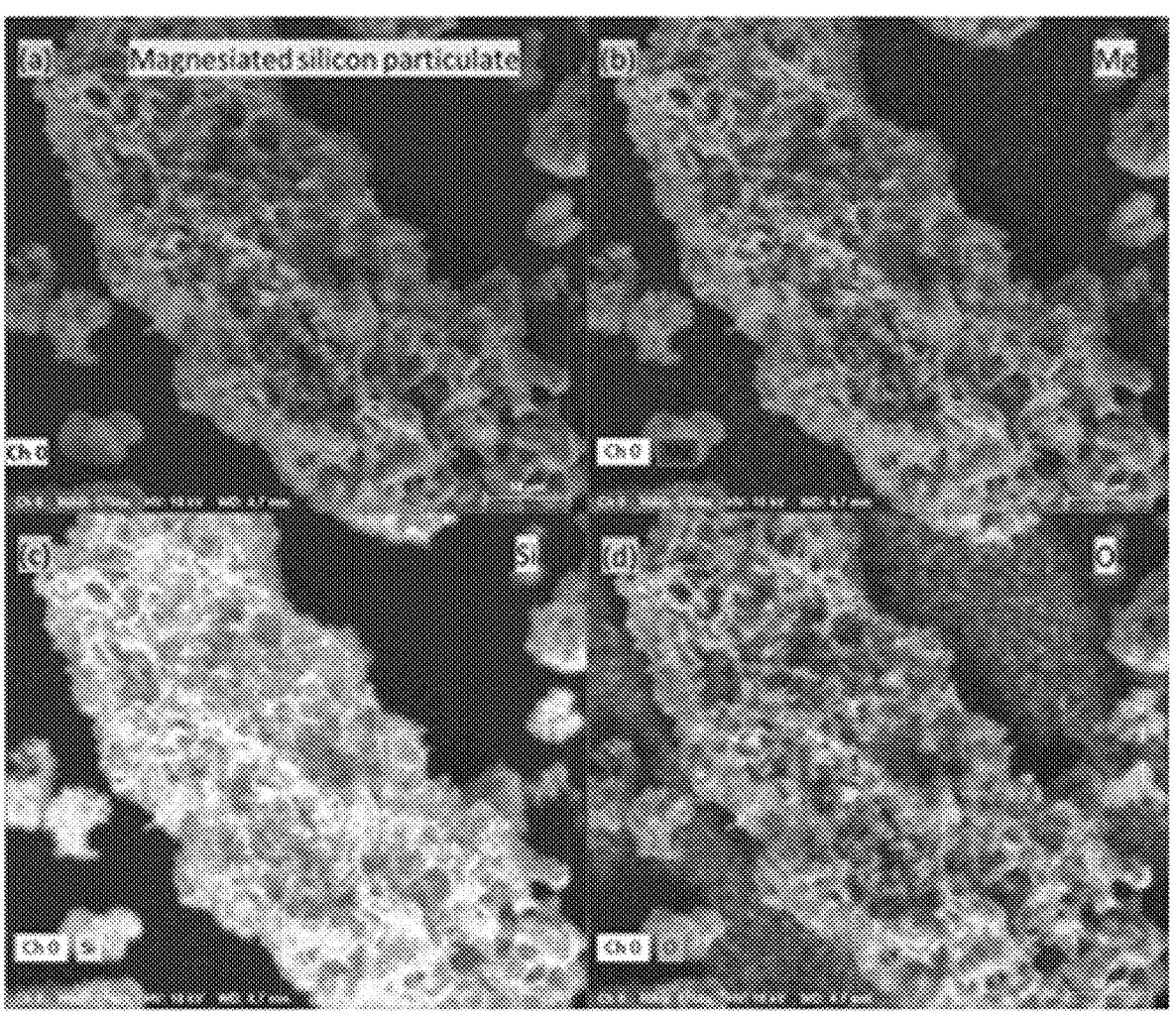
FIG. 6A-6D is a close up image of the Mg-reduced silica particulate of FIG. 5, showing in (A) its porous nature and elemental mapping identifying (B) Mg, (C) Si, and (D) O.

The second intermediate product after magnesiothermal reduction was a dark powder and was similarly characterized by SEM EDS (FIG. 5). The results indicated that the particles were enveloped with a layer of Mg and that the Al was limited to a fraction of the particulates. Referring to FIG. 6A, SEM images showed that the particulate formed after the Mg thermal reduction were still porous. Referring to FIG. 6B, it appeared that the Mg infiltrated the porous particulates without over deposition or blocking of the pores.

The brown particulate (the third intermediate product) product was characterized by SEM and EDS. SEM EDS studies confirmed the near-complete removal of Mg from the second intermediate. FIG. 8 shows that the Mg content was very small and barely detectable in the EDS spectrum. Some silica remained in the final product, either on the particulate surface or within its matrix. Table 3 shows the composition of the third intermediate product as analyzed by EDS.

TABLE 3

| | | | | | | Abs. Error % (1 | Rel. Error % (1 |
|---|---|---|---|---|---|---|---|
| Element | At. No. | Netto | Wt % | Wt Norm. % | Atom % | sigma) | sigma) |
| Oxygen | 8 | 359 | 0.32874 | 0.32874 | 0.577423 | 0.035616 | 10.83405 |
| Sodium | 11 | 0 | 0 | 0 | 0 | 0 | 2.540918 |
| Magnesium | 12 | 0 | 0 | 0 | 0 | 0 | 2.514465 |
| Aluminum | 13 | 1054 | 0.452367 | 0.452367 | 0.471662 | 0.036332 | 8.031481 |
| Silicon | 14 | 190603 | 97.64327 | 97.64327 | 97.70246 | 2.467781 | 2.527344 |
| Sulfur | 16 | 0 | 0 | 0 | 0 | 0 | 2.5584 |
| Chlorine | 17 | 1813 | 1.575621 | 1.575621 | 1.248958 | 0.064847 | 4.115645 |
| Total | | | 100 | 100 | 100 | | |

Third Intermediate Product EDS Characterization

The final product was characterized by SEM, EDS and TEM. Referring to FIG. 10, SEM surface analysis showed particle sizes ranging from 60 to 100 μm with varying porosity distributions. Referring to FIG. 11A, TEM bright field imaging of a representative particular showed a grain size distribution of about 20 nm to 30 nm. The EDS spectrum indicated that the particulates were about 94 wt % Si, with the respect being Al and Mg. The selected area electron diffraction (SAED) analysis confirmed that the Si product had a nanocrystalline, diamond cubic structure, which is typically for pure Si.

The use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict embodiments for purposes of illustration only. One of ordinary skill in the art will readily recognize from the following discussion that alternative embodiments of the structures and methods illustrated herein may be employed without departing from the principles described herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of forming porous silicon particles from a silicate source, comprising:

removing contaminants comprising organic contaminants and heavy metals and alumina from the silicate source by treating with first and second acidic leaching solutions, the first acidic leaching solution comprising sulfuric acid and hydrogen peroxide, and the second acidic leaching solution comprising an aqueous solution of perchloric acid, wherein the organic contaminants and alumina react with the first acidic leaching solution and heavy metals react with the second acidic leaching solution such that the contaminants are removed from the silicate source with a decanting of the first and second acidic leaching solutions thereby forming a first intermediate product, wherein the first intermediate product comprises silica and a reduced amount of aluminum and sodium as compared to the silicate source;

reducing the first intermediate product to form a second intermediate product by reacting the first intermediate product with magnesium vapor at a temperature of about 700° C. to about 750° C. to reduce silica present in the first intermediate product to produce porous magnesiated silicon particulates;

removing magnesium and magnesium containing compounds from the second intermediate product to form a third intermediate product by treating the second intermediate product with a third leaching solution comprising one or more of hydrochloric acid, nitric acid, and perchloric acid at a temperature of about 10° C. to about 30° C. and removing the third leaching solution to leave a third intermediate product; and treating the third intermediate product with a fourth leaching solution comprising hydrofluoric acid (HF) at a temperature of about 10° C. to about 30° C. to remove remnant silica from the third intermediate product and thereby provide the porous nanocrystalline silicon particles, wherein reducing the first intermediate product comprises placing the first intermediate on a porous divider above the magnesium and/or magnesium containing compounds and heating the first intermediate product and the magnesium and/or magnesium containing compounds to a temperature of about 700° C. to 750° C. in an Ar atmosphere to produce a magnesium vapor having a vapor pressure of about 3 Torr (0.05 Psi) and which is capable of interacting with first intermediate product to reduce the first intermediate product to form the second intermediate product, or wherein reducing the first intermediate product comprises exposing the first intermediate product to a magnesium vapor under vacuum while maintaining a temperature of about 700° C. to about 750° C. and a magnesium vapor pressure of about 10 Torr to 17 Torr.

2. The method of claim 1, comprising:

treating the silicate source with the first acidic leaching solution and recovering a slurry and treating the slurry with the second leaching acidic solution to form the first intermediate product, or treating the silicate source with the second acidic leaching solution and recovering a slurry and treating the slurry with the first acidic leaching solution.

3. The method of claim 1, further comprising repeating treatment with the first and/or second acidic leaching solutions one or more times before reducing the first intermediate product.

4. The method of claim 1, wherein the first acidic leaching solution comprises 1 M sulfuric acid and 30% hydrogen peroxide.

5. The method of claim 1, wherein treatment with the first acidic leaching solution is at a temperature of about 55° C. to about 65° C., and treatment with the second acidic leaching solution is at room temperature.

6. The method of claim 1, wherein the second acidic leaching solution comprises 2 parts perchloric acid and 1 part $H_2O$.

7. The method of claim 1, wherein treating with the first acidic leaching solution and/or the second acidic leaching solution comprises mixing for a treatment time of about 24 hours followed by allowing settling for about 12 hours before decanting.

8. The method of claim 1, further comprising grinding the first intermediate product before reducing the first intermediate product.

9. The method of claim 1, wherein the magnesium and/or magnesium containing compound comprises magnesium pellets.

10. The method of claim 1, wherein the third leaching solution comprises 20 vol % hydrochloric acid and 80 vol % deionized water.

11. The method of claim 1, further comprising rinsing the third intermediate product with water after decanting the third leaching solution and before treating with the fourth leaching solution.

12. The method of claim 1, wherein treating with the third leaching solution comprises mixing the second intermediate product with the third leaching solution until a reaction between Mg present in the second intermediate product and chloride (CI) ions present in the third leaching solution is complete, and then allowing particulate present after reaction to settle under ambient conditions before decanting the third leaching solution and recovering the third intermediate product.

13. The method of claim 1, wherein the second intermediate is treated with the third leaching solution for about 24 hours.

14. The method of claim 1 wherein the fourth leaching solution comprises 80 vol % hydrofluoric acid (HF) and 20 vol % water.

15. The method of claim 1 wherein the third intermediate is treated with the fourth leaching solution for about 24 hours.

16. The method of claim 1, wherein the nanocrystalline silicon particulates are at least 90% pure silicon.

17. The method of claim 16, wherein the nanocrystalline silicon particulates are brown in color.

18. The method of claim 1, wherein the nanocrystalline silicon particulates comprise micropores having an average diameter of about 0.2 μm to about 2 μm and mesopores having an average diameter of about 1 μm to about 5 μm.

19. The method of claim 1, wherein the silicate source comprises zeolites.

* * * * *